US007785384B2

(12) United States Patent
Schramm et al.

(10) Patent No.: US 7,785,384 B2
(45) Date of Patent: Aug. 31, 2010

(54) PLEATED DIESEL PARTICULATE FILTER ASSEMBLY

(75) Inventors: Eric J. Schramm, Port Clinton, OH (US); Phil P. Treier, Bloomdale, OH (US); Bradley R. Postage, Findlay, OH (US); Donald W. Baldwin, Jr., Perrysburg, OH (US)

(73) Assignee: Honeywell International Inc., Morristown, NJ (US)

( * ) Notice: Subject to any disclaimer, the term of this patent is extended or adjusted under 35 U.S.C. 154(b) by 254 days.

(21) Appl. No.: 11/971,873

(22) Filed: Jan. 9, 2008

(65) Prior Publication Data

US 2008/0196370 A1   Aug. 21, 2008

Related U.S. Application Data

(60) Provisional application No. 60/884,215, filed on Jan. 9, 2007, provisional application No. 60/910,177, filed on Apr. 4, 2007, provisional application No. 60/884,214, filed on Jan. 9, 2007, provisional application No. 60/910,165, filed on Apr. 4, 2007, provisional application No. 60/944,355, filed on Jun. 15, 2007.

(51) Int. Cl.
*B01D 46/12* (2006.01)
*B01D 46/02* (2006.01)
*B01D 46/52* (2006.01)

(52) U.S. Cl. ............................ 55/484; 55/497; 55/498; 55/521; 55/523; 55/DIG. 30; 55/DIG. 31

(58) Field of Classification Search .................. 55/483, 55/484, 497, 498, 499, 501, DIG. 31, 521, 55/DIG. 30, 523
See application file for complete search history.

(56) References Cited

U.S. PATENT DOCUMENTS 2,013,038 A * 9/1935 Dollinger .................... 55/484
3,857,688 A * 12/1974 Wisnewski .................. 55/483
4,559,138 A * 12/1985 Harms, II .................. 210/316
4,871,380 A * 10/1989 Meyers ....................... 55/483
4,873,069 A * 10/1989 Weaver et al. .............. 117/75
4,894,074 A * 1/1990 Mizrah et al. ............... 55/482
4,913,712 A * 4/1990 Gabathuler et al. .......... 55/482

(Continued)

FOREIGN PATENT DOCUMENTS

| JP | 61-107918 A | 10/1986 |
| JP | 05-001524 | 1/1993 |
| JP | 08-109820 | 4/1996 |
| JP | 15-027918 | 1/2003 |
| JP | 16-510908 | 4/2004 |
| JP | 2004-316513 | 11/2004 |

OTHER PUBLICATIONS

International Search Report Dated May 27, 2008, International Application No. PCT/US2008/050676.
Written Opinion of International Searching Authority Dated May 27, 2008, International Application No. PCT/US2008/050676.

*Primary Examiner*—Michael A Marcheschi
*Assistant Examiner*—Robert A Clemente
(74) *Attorney, Agent, or Firm*—Cantor Colburn LLP (57) ABSTRACT

A filter assembly is configured to be incorporated into an exhaust treatment device. The filter assembly comprises a frame, a filter media element, and a plurality of dividers supporting the filter media element within the frame. The frame has a first end and a second end defining a frame length therebetween. The filter media element is disposed within the frame and extends generally perpendicular to the frame length as a series of pleated contours. The plurality of dividers includes a first divider and a second divider. The first divider is disposed adjacent to the filter media element at the first end of the frame. The second divider is disposed adjacent to the filter media element at the second end of the frame.

11 Claims, 5 Drawing Sheets

U.S. PATENT DOCUMENTS

| | | | |
|---|---|---|---|
| 5,087,272 A * | 2/1992 | Nixdorf | 95/20 |
| 5,250,269 A | 10/1993 | Langer | |
| 5,261,934 A * | 11/1993 | Shutic et al. | 95/280 |
| 5,290,330 A * | 3/1994 | Tepper et al. | 96/381 |
| 5,306,332 A * | 4/1994 | Allen | 95/273 |
| 5,593,645 A | 1/1997 | Steenackers et al. | |
| 5,803,941 A * | 9/1998 | Berkhoel et al. | 55/498 |
| 6,190,431 B1 * | 2/2001 | Jeanseau et al. | 55/385.2 |
| 6,203,591 B1 * | 3/2001 | Clements et al. | 55/341.1 |
| 6,375,698 B1 * | 4/2002 | Clements et al. | 55/341.1 |
| 6,485,538 B1 * | 11/2002 | Toyoshima | 55/490 |
| 6,572,682 B2 * | 6/2003 | Peter et al. | 95/278 |
| 6,883,309 B2 | 4/2005 | Jobson et al. | |
| 6,913,059 B2 * | 7/2005 | Nixdorf | 156/474 |
| 7,291,197 B2 * | 11/2007 | Costura et al. | 55/497 |
| 2004/0103626 A1 * | 6/2004 | Warth et al. | 55/467 |
| 2004/0128988 A1 | 7/2004 | Frankle et al. | |
| 2006/0216467 A1 | 9/2006 | Yoshida | |

* cited by examiner

PLEATED DIESEL PARTICULATE FILTER ASSEMBLY

This application claims the benefit of U.S. Provisional Application Ser. No. 60/884,215, filed Jan. 9, 2007, and U.S. Provisional Application Ser. No. 60/910,177, filed Apr. 4, 2007, each of which is incorporated herein in their entirety by reference thereto.

This application also claims the benefit of the following patent applications: U.S. Provisional Application Ser. No. 60/884,214, filed Jan. 9, 2007; U.S. Provisional Application Ser. No. 60/910,165, filed Apr. 4, 2007; and U.S. Provisional Application Ser. No. 60/944,355, filed Jun. 15, 2007; each of which is incorporated herein in their entirety by reference thereto.

BACKGROUND

Exemplary embodiments of the present invention relate to particulate filters for diesel exhaust systems. More particularly, exemplary embodiments of the present invention relate to particulate filter assemblies that utilize pleated ceramic filter media and can be incorporated into diesel exhaust treatment devices.

Because regulatory agencies have recently mandated the reduction of particulate emissions in diesel engines, there has been increased activity in the development of diesel particulate filters, that is, exhaust emission filters for diesel engines. The role of a typical diesel particulate filter is to trap and remove the particulate components of the diesel exhaust stream, which include diesel soot and aerosols such as ash particulates, metallic abrasion particles, sulfates, and silicates, to prevent their discharge from the tailpipe.

There are a variety of diesel particulate filtration technologies on the market. For every diesel particulate filter, two performance aspects are crucial: the filtration efficiency of the system and the ability of the system to provide long-term operation without diminishing the filtration efficiency of the filter and performance of the engine. Factors that are critical to these performance aspects for a particular diesel particulate filter include whether the filter has the ability to handle temperatures up to 1400° C., a high capability to store soot and ash, a low pressure loss, a low thermal mass, stability, and durability. In addition, manufacturing costs and assembly volume are important considerations.

The filtration is achieved by a porous structure that allows transmission of the fluid phase but stops or captures diesel particulate matter larger than a threshold particle size. A variety of effective pore sizes are available and, accordingly, filters vary in their filtration efficiencies as a function of particle size of the diesel particulate matter.

Every filter has a finite capacity, and an overfilled diesel particulate filter can damage the engine through excessive exhaust backpressure and can itself be damaged or destroyed. Due to the low bulk density of diesel particulates, diesel particulate filters can quickly accumulate considerable volumes of soot. To prevent the filter pore clogging that causes backpressure to increase, thereby increasing load on the engine, the trapped particulate material is burned from the filter by continuous or periodic oxidation in the process of regeneration.

In most cases, thermal regeneration of diesel filters is employed, where the collected particulates are removed from the filter by oxidation to gaseous products. To ensure that particulates are oxidized at a sufficient rate, the filter must operate at a sufficient temperature and oxidizing gases, such as oxygen or nitrogen dioxide (or its precursors), must be supplied to the filter. In some filter systems, the source of heat (as well as of the oxidizing gases) is the exhaust gas stream itself. In this case, the filter, referred to as a passive filter, regenerates continuously during the regular operation of the engine. Passive filters usually incorporate some form of a catalyst, which lowers the soot oxidation temperature to a level that can be reached by exhaust gases during the operation of the vehicle. Another approach to facilitate reliable regeneration involves a number of active strategies of increasing the filter temperature (for example, engine management, electric heaters, microwaves, etc.). Regeneration of such systems, known as active filters, is usually performed periodically, as determined by the vehicle's control system.

Regeneration of filters that include a ceramic-based filter element, employing microwave energy, is also possible.

The most common type of diesel particulate filter structure is an extruded honeycomb monolithic structure, or wall-flow filter, in which the exhaust gases flow through walls between many small parallel channels, typically of square cross-section, so that the particulate matter accumulates on the upstream surface of the walls. Extruded wall-flow filters typically consist of a ceramic membrane. Because diesel exhaust is a high velocity gas stream, extruded wall-flow filters are not optimal structures because they exhibit high thermal mass, low porosity, and high backpressure.

Accordingly, there is a need to design filter assembly geometries for particulate filters for diesel exhaust treatment devices that can overcome one or more of the problems presented by current monolithic style filters, such as high thermal mass, high restriction, low capacity, poor mechanical and thermal durability, and limited packaging flexibility.

SUMMARY OF THE INVENTION

Exemplary embodiments of the present invention are directed to a filter assembly configured to be incorporated into an exhaust treatment device. The filter assembly comprises a frame, a filter media element, and a plurality of dividers supporting the filter media element within the frame. The frame has a first end and a second end defining a frame length therebetween. The filter media element is disposed within the frame and extends generally perpendicular to the frame length as a series of pleated contours. The plurality of dividers includes a first divider and a second divider. The first divider is disposed adjacent to the filter media element at the first end of the frame. The second divider is disposed adjacent to the filter media element at the second end of the frame.

Exemplary embodiments of the present invention are also directed to a filter assembly configured to be incorporated into an exhaust treatment device. The filter assembly comprises a frame, a first filter media element and a second filter media element arranged within the frame in parallel along the frame length, and a plurality of dividers supporting the first and second filter media elements within the frame. The frame has a first end and a second end defining a frame length therebetween. The first filter media element is disposed proximate to the first end. The second filter media element is disposed proximate to the second end. Each filter media element extends generally perpendicular to the frame length as a series of pleated contours. The plurality of dividers includes a first divider, a second divider, and a third divider. The first divider is disposed adjacent to the first filter media element at the first end of the frame, the second divider is disposed adjacent to the second filter media element at the second end of the frame, and the third divider is disposed between the first and second filter media elements.

Exemplary embodiments of the present invention are also directed to a filter assembly configured to be incorporated into an exhaust treatment device. The filter assembly comprises a frame, a plurality of filter media elements arranged within the frame in parallel along the frame length, and a plurality of dividers supporting the plurality of filter media elements within the frame. Each filter media element of the plurality of filter media elements is shaped as a series of pleated contours extending generally perpendicular to the frame length. The plurality of filter media elements includes a first filter media element disposed proximate to the first end and a second filter media element disposed proximate to the second end. The plurality of dividers includes a first divider disposed adjacent to the first filter media element at the first end of the frame, a second divider disposed adjacent to the second filter media element at the second end of the frame, and at least one intermediate divider. A distinct intermediate divider of the at least one intermediate dividers is disposed between each pair of adjacent filter media elements of the plurality of filter media elements along the frame length.

Exemplary embodiments of the present invention are also directed to an exhaust treatment device that comprises a housing having an inlet end and an outlet end, an inlet flow member configured to direct exhaust emissions into the housing, an outlet flow member configured to discharge exhaust emissions from the housing, a first heat-barrier matting layer disposed within the housing proximate to the inlet end, a second heat-barrier matting layer disposed within the housing proximate to the outlet end, and a filter assembly configured to be incorporated into the housing. The inlet flow member extends outwardly from the inlet end of the housing, and the outlet flow member extends outwardly from the outlet end of the housing. The filter assembly has a frame, a plurality of filter media elements, and a plurality of dividers. The frame has a first end adjacent to the inlet end of the housing and a second end adjacent to the outlet end of the housing. The first and second ends define a frame length therebetween. The plurality of filter media elements are arranged within the frame in parallel along the frame length. Each filter media element of the plurality of filter media elements is shaped as a series of pleated contours extending generally perpendicular to the frame length. The plurality of filter media elements includes a first filter media element disposed proximate to the first end and a second filter media element disposed proximate to the second end. The plurality of dividers support the plurality of filter media elements within the frame and include a first divider disposed adjacent to the first filter media element at the first end of the frame, a second divider disposed adjacent to the second filter media element at the second end of the frame, and at least one intermediate divider such that a distinct intermediate divider of the at least one intermediate divider is disposed between each pair of adjacent filter media elements of the plurality of filter media elements along the frame length. The filter assembly is configured so that the first and second dividers engage the first and second heat-barrier matting layers respectively to align the filter assembly in a fixed position within the housing so that exhaust emissions flowing from the inlet member to the outlet member pass through the plurality of filter media elements.

DETAILED DESCRIPTION OF EXEMPLARY EMBODIMENTS

Exemplary embodiments of filter assemblies in accordance with the present invention will now be described with reference to the accompanying drawings. The exemplary filter assemblies described herein are configured to be incorporated within housing canisters to form exhaust treatment devices that are in fluid connection with the exhaust gas pipes of a diesel engine. As opposed to conventional wall-flow filter assemblies, the exemplary filter assemblies described herein can be modified for incorporation into housing canisters of many varying dimensions and applications. Thus, when a filter assembly is incorporated in this manner, exhaust emissions that are discharged from a diesel engine to flow through the exhaust pipe are directed across the filter assembly so that particulates contained in the exhaust emissions are collected by pleated fiber filter media disposed within the filter assembly. The filter media are pleated to increase filtration area. The collected particulates can then be heated and incinerated to regenerate the filter assembly using one of several known techniques.

In accordance with an exemplary embodiment of the present invention, a filter assembly that can be configured to be incorporated into an exhaust treatment device is illustrated with various views in FIGS. 1-4. Filter assembly 10 has an inlet flow side 12, an outlet flow side 14, and a rigid panel ceramic frame 16. The filter assembly also includes first and second columns of pleated fiber filter media 18a, 18b configured to remove particulate matter from an exhaust flow. The filter element is disposed within and supported by the ceramic frame, which can constitute ceramic fibers and can be formed from a ceramic injection molding or casting process.

The frame includes a front panel 20, a back panel 22, and an intermediate divider panel 24 therebetween. Each of these panels extends laterally within the frame and longitudinally from the inlet flow side of the frame to the outlet flow side. The front panel has a front transverse flange 26 extending outwardly from the front of the frame at the outlet flow side to form an approximately 'L'-shaped cross-section, and the back panel has a back transverse flange 28 extending outwardly from the back of the frame at the inlet flow side to form an inverted, approximately 'L'-shaped cross-section. The frame also includes two sidewall panels 30, 32 extending transversely from the front panel to the back panel on opposing sides of the frame body to provide the frame with a rectangular shape.

Figure 1:
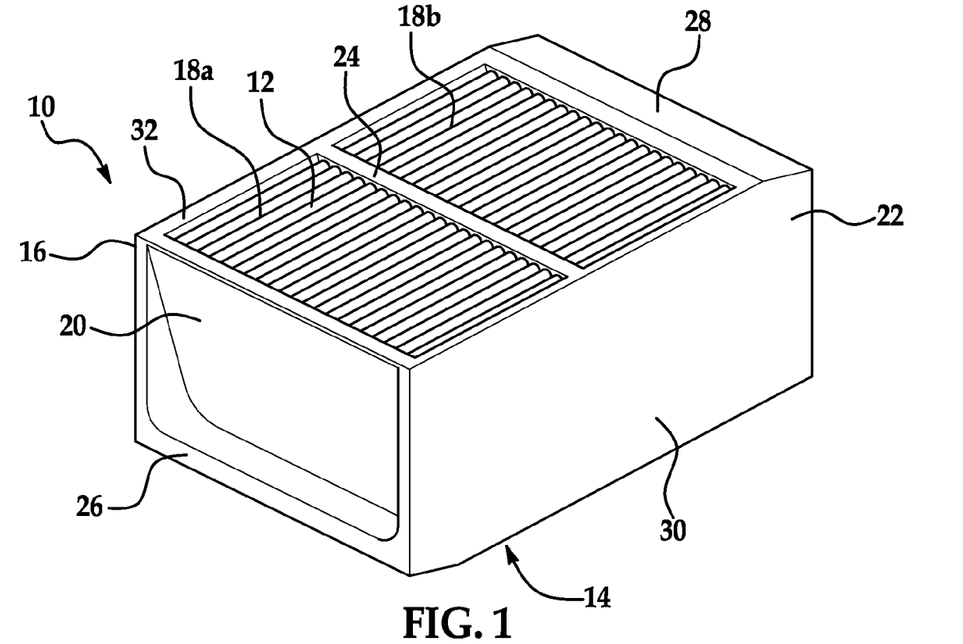
FIGS. 1-4 illustrate various views of an exemplary embodiment of a filter assembly in accordance with the present invention.
Figure 2:
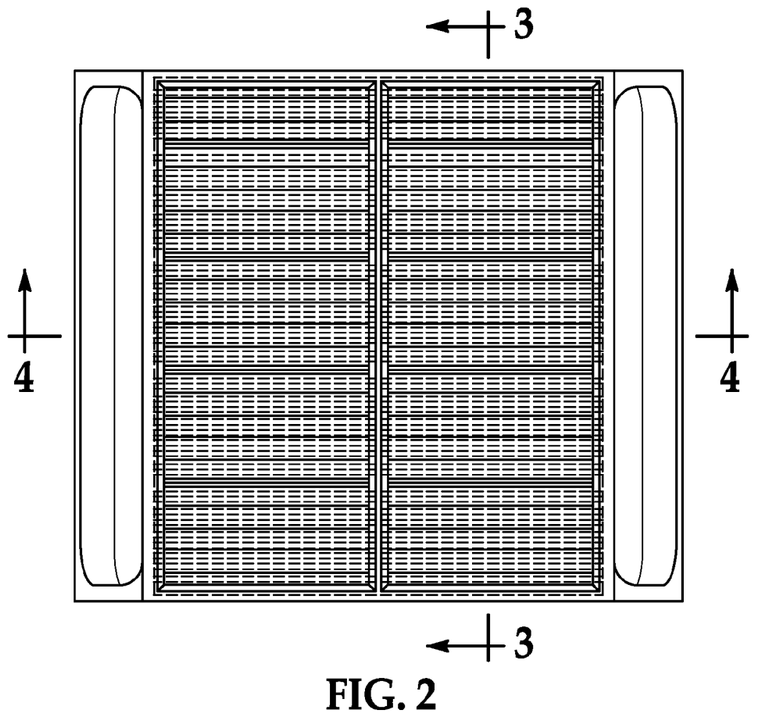
Figure 3:
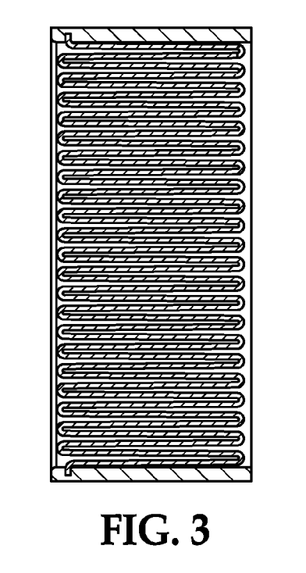
Figure 4:
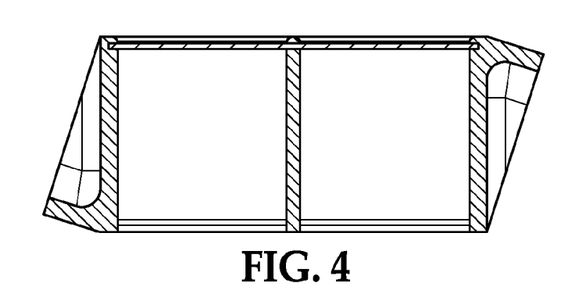

In the exemplary embodiment illustrated in FIG. 1, the first and second columns of pleated ceramic fiber filter media are disposed within the frame and extend as a plurality of pleated contours between the two sidewall panels. The first column of filter media is supported between the front panel and the divider panel, and the second column of filter media is supported between the back panel and the divider panel. The heights of the pleated contours extend from the inlet flow side of the frame to the outlet flow side. The filter assembly may include a means for sealing the filter media to the sidewall panels at either end of the columns of filter media.

Both the number and the size of the columns of pleated filter media illustrated in the exemplary embodiment of FIG. 1 should be considered non-limiting. It is contemplated that alternative exemplary embodiments of such a filter assembly could, for instance, include a single column of filter media supported between a front panel and a back panel and not include a divider panel. Other exemplary embodiments could, for instance, include more than two columns of filter media each supported between two of more than three panels, in which case the frame would include as many divider panels as necessary to provide support for the total number of filter media columns. The filter media columns can be configured to be of a transverse width (that is, panel-to-panel distance) appropriate for the width of the pleated filter elements as manufactured and/or the dimensions of the housing in which the filter assembly will be incorporated. The configuration of the filter media columns supported within the filter assembly in various exemplary embodiments can depend on the back pressure, filtration, size, and other requirements of a particular application. Therefore, as opposed to conventional wall-flow filter assemblies, the present exemplary filter assembly can be modified for incorporation into housing canisters of many varying dimensions and applications.

Figure 5:
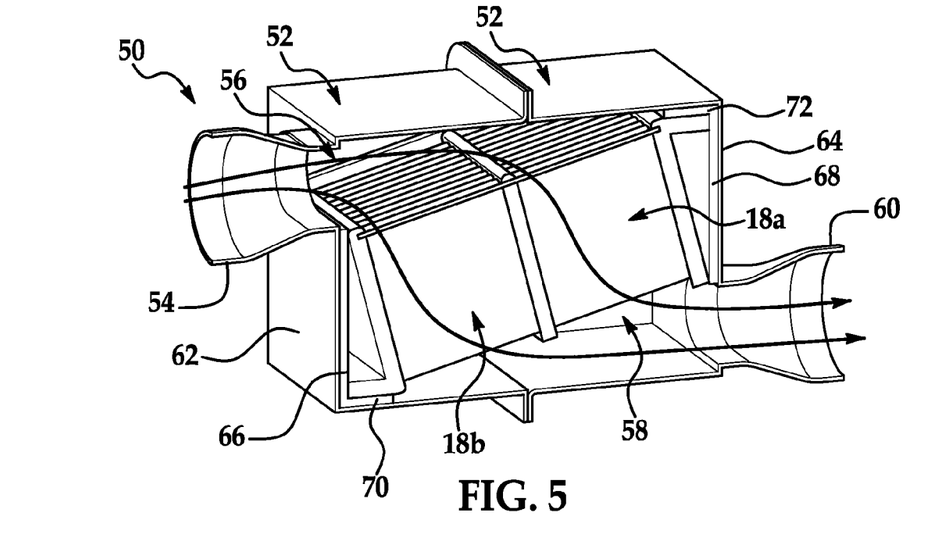
FIG. 5 is a cross-sectional view of an exemplary embodiment of an exhaust treatment device incorporating the exemplary filter assembly of FIGS. 1-4.

Referring now to FIG. 5, an exemplary embodiment of an exhaust treatment device incorporating exemplary filter assembly 10 of FIG. 1 is illustrated. The exemplary exhaust treatment device, indicated generally by 50, may be configured to receive emissions from an exhaust-producing system (not shown) and to remove particulates and gaseous compounds from the emissions before being exhausted to the atmosphere. The exhaust treatment device includes a housing canister 52 within which the filter assembly is disposed.

In the present exemplary embodiment, the housing includes a conical exhaust inlet 54 configured to receive an exhaust flow from the exhaust-producing system, an inlet chamber 56, an outlet chamber 58, and a conical exhaust outlet 60. The housing is also depicted in FIG. 5 as having a rectangular cross-sectional shape along its length. Nevertheless, it should be noted that the cross-sectional shape of the housing in the present exemplary embodiment should be considered non-limiting, and it is also contemplated that, in other exemplary embodiments, the housing may have a cross-sectional shape other than rectangular such as, for example, circular, square, oval, or another appropriate shape.

In the present exemplary embodiment, the inlet chamber is located within the housing in the space between the inlet and the inlet flow side of the filter assembly to have a substantially triangular cross-sectional shape along a length direction. The inlet is depicted in FIG. 5 as having a substantially circular cross-section. Nevertheless, it should be noted that the cross-sectional shape of the inlet in the present exemplary embodiment should be considered non-limiting, and it is also contemplated that, in other exemplary embodiments, the inlet may have a differently shaped cross-section such as oval, square, rectangular, triangular, or any other suitable cross-section. The outlet chamber is located within the housing in the space between the outlet and the outlet flow side of the filter assembly to have a substantially triangular cross-sectional shape along a length direction. The outlet is depicted in FIG. 5 as having a substantially circular cross-section. Nevertheless, it should be noted that the cross-sectional shape of the outlet in the present exemplary embodiment should be considered non-limiting, and it is also contemplated that, in other exemplary embodiments, the outlet may have a differently shaped cross-section such as oval, square, rectangular, triangular, or any other suitable cross-section. In FIG. 5, the inlet is shown as projecting from a first end 62 of the housing in a length direction of the housing, and the outlet is shown as projecting from a second end 64 of the housing in the length direction of the housing, opposite the first end. Nevertheless, it should be noted that the present exemplary embodiment should be considered non-limiting, and it is also contemplated that, in other exemplary embodiments, the inlet and/or the outlet may alternately project from a side of the housing that is orthogonal or tangential to the length direction.

The filter assembly of the present exemplary embodiment is configured to be disposed and aligned within the housing on an angle, as illustrated in FIG. 5. To utilize this positioning to accommodate the flow of exhaust emissions through the exhaust treatment device, the filter assembly is aligned so that the inlet that projects from the first end of the housing is located adjacent to the front panel at the inlet flow side of the frame, and the outlet that projects from the second end of the housing is located adjacent to the back panel at the outlet flow side of the frame. This configuration provides for the triangular cross-sectional shapes of the inlet and outlet chambers.

In the exemplary embodiment illustrated in FIG. 5, the housing also includes a front heat-barrier matting layer 66 for engaging the front panel of the filter assembly and a back heat-barrier matting layer 68 for engaging the back panel. The front matting layer is disposed along the inside of the front end of the housing to engage the inlet flow side of the front panel that is adjacent to the housing inlet, and the front matting layer includes a front projection 70 extending inwardly within the housing to engage the front transverse flange at the outlet flow side of the front panel. The back matting layer is disposed along the inside of the back end of the housing to engage the outlet flow side of the back panel that is adjacent to the housing outlet, and the back matting layer includes a back projection 72 extending inwardly within the housing to engage the back transverse flange at the inlet flow side of the back panel.

In exemplary embodiments, the exhaust treatment device may include a mechanism for sealing the filter assembly in its angled position to one or more locations on the matting layers within the inside of the housing. Such a sealing mechanism may include, for example, a ceramic paste, a weld, a braze, a compression of the front panel and/or the back panel with the matting layers, a gasket, or any other known means.

During operation of the present exemplary exhaust treatment device, when the diesel engine is driven, exhaust emissions bearing hazardous particulates are sent into the exhaust flow path via the exhaust pipe and directed into the housing inlet, as indicated by the arrows in FIG. 5. The configuration of the exhaust treatment device facilitates a first generally orthogonal redirection of the exhaust emissions that have been directed into the inlet chamber via the housing inlet to flow in parallel through the pleated contours of the columns of filter media from the inlet flow side to the outlet flow side. The flow of exhaust emissions within the inlet chamber will adjust itself to be distributed evenly to yield minimal resistance when channeled through the filter assembly. As the emissions pass through the filter assembly, particulates in the stream are captured on the exposed surfaces of the pleated contours. The configuration of the exhaust treatment device then facilitates a second generally orthogonal redirection of the resulting clean exhaust emissions to flow from the outlet chamber toward the housing outlet, where the emissions are discharged from the exhaust treatment device.

By configuring the filter assembly to be incorporated within a given filter housing so that it is aligned on an angle, as shown in the exemplary embodiment of FIG. 5, the columns of filter media can be provided with a greater depth and greater media packing density than in typical depth filters. Because the angular displacement of the filter assembly permits the inlet and outlet chambers to have triangular cross-sectional shapes, the longitudinal length of the filter assembly from the inlet flow side to the outlet flow side can be extended without restricting the rate of flow of exhaust emissions through the housing. As a result, the filter assembly can be used to support filter media having pleats with increased height for an exhaust treatment device having a given housing volume. Thus, the angled alignment enables the filter assembly to have a greater soot loading capacity.

Figures 6, 7A, 7B:
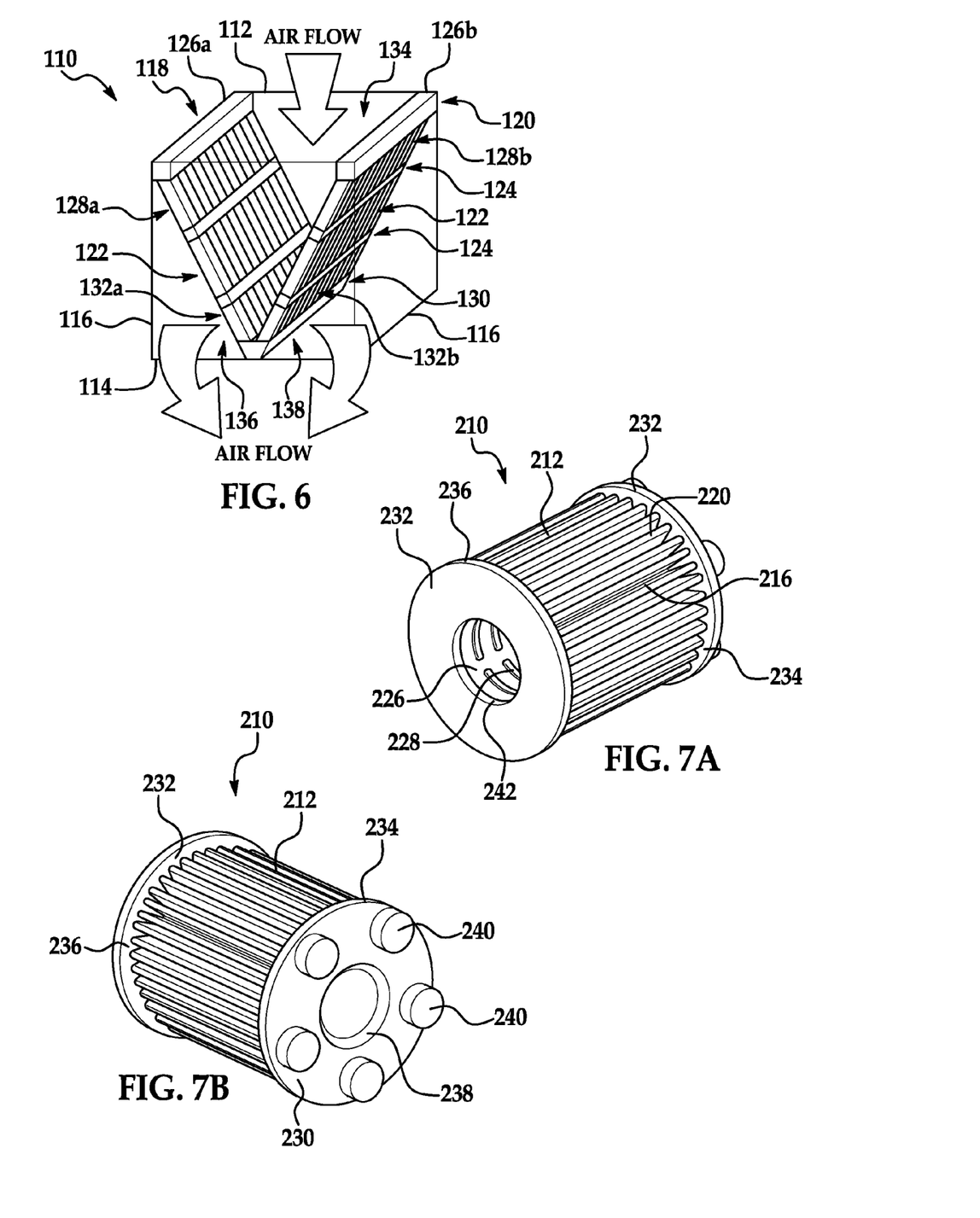
FIG. 6 is a cross-sectional view of an alternative exemplary embodiment of a filter assembly in accordance with the present invention.
FIGS. 7a and 7b are opposing side views of a second alternative exemplary embodiment of a filter assembly in accordance with the present invention.

Referring now to FIG. 6, another exemplary embodiment of a filter assembly that can be configured to be incorporated into an exhaust treatment device is illustrated. Filter assembly 110 has an inlet flow side 112, an outlet flow side 114, and a rigid, rectangular four-panel frame 116. In exemplary embodiments, the frame can comprise a ceramic material and can be formed from a ceramic injection molding or casting process.

In one non-limiting exemplary embodiment, the filter media is disposed within and supported by the ceramic frame, and comprises a ceramic fiber material, which in accordance with non-limiting exemplary embodiments of the present invention, can be selected from silicon carbide, silicon nitride, cordierite, aluminum oxide, alumina silicate, and combinations thereof. In exemplary embodiments, the ceramic media can be formed by a ceramic injection molding or casting process.

In the present exemplary embodiment, filter assembly 110 includes a pair of converging banks 118, 120 of filter media. Each bank includes a plurality of wall segments 122 of pleated ceramic fiber filter media extending generally perpendicularly to the direction of air flow. The height of the pleated contours of the filter media is approximately equivalent to the width of the banks. The wall segments on each bank are separated and supported by a plurality of rigid ceramic dividers 124 that extend in a direction that is generally parallel to the pleated filter media. Each bank includes a front divider 126a, 126b. The two front dividers are adjacent to its respective bank's foremost wall segment 128a, 128b and to respectively opposing panels of the frame at the inlet flow side. The two banks are disposed within the housing at opposing angles to converge at the outlet flow side of the frame, where the two banks share a back divider 130 that extends between opposing panels of the frame at the outlet flow side and is adjacent to a rearmost wall segment 132a, 132b of each bank.

In exemplary embodiments, the filter assembly can be configured to be incorporated into a housing canister (not shown) to form an exhaust treatment device of a diesel engine. Such an exhaust treatment device may be configured to receive emissions from an exhaust-producing system and to remove particulates and gaseous compounds from the emissions before being discharged to the atmosphere. The exhaust treatment device can include a means for sealing the front dividers and/or the back divider to the inside of the housing to secure the filter assembly in its dual-angled position within of the housing. The means for sealing may include, for example, a ceramic paste, a weld, a braze, compression, a gasket, or any other known means. The housing can include a conical exhaust inlet configured to receive an exhaust flow from the exhaust-producing system and a conical exhaust outlet configured to discharge exhaust emissions from the exhaust treatment device. The housing may have a rectangular cross-sectional shape along its length. It is also contemplated that the housing may have a cross-sectional shape other than rectangular such as, for example, circular, square, oval, or another appropriate shape.

When the exemplary filter assembly of FIG. 6 is incorporated into a housing canister, an inlet chamber 134 is formed within the housing in the area between the two banks of the filter assembly and the housing inlet to have a substantially triangular cross-sectional shape along a length direction. First and second outlet chambers 136, 138 are also formed within the housing in the respective areas formed between each bank, the frame, and the housing outlet to have substantially triangular cross-sectional shapes along a length direction. By configuring the filter assembly within a housing in the manner described, the frontal filter media area that is open to exhaust flow from the inlet chamber can be significantly greater than a typical filter assembly. The back filter media area that is open to emit exhaust flow into the outlet chamber is also significantly greater. By reducing the filter flow resistance in this manner, the configuration can result in a reduction in backpressure. This configuration can be used to provide exhaust treatment devices that accommodate the full spectrum of diesel exhaust flow rates.

When incorporated as part of an exhaust treatment device as described, the present exemplary exhaust treatment device can operate in the following manner. While the diesel engine is being driven, exhaust emissions bearing hazardous particulates are directed into the exhaust flow path via the exhaust pipe, as indicated by the arrows in FIG. 6, to flow into the housing inlet (not shown). The configuration of the filter assembly directs the flow of exhaust emissions that have been directed into the inlet chamber via the housing inlet to proceed in a generally linear manner. That is, exhaust emissions flow from the inlet chamber, through the wall segments of pleated filter media, and then to the first and second outlet flow chambers without being substantially redirected. As the emissions pass through the filter, the particulates in the stream are captured on the exposed surfaces of the pleats. The resulting clean exhaust emissions then exit the exhaust treatment device via the housing outlet (not shown).

Both the number and dimensions of the wall segments of the exemplary embodiment illustrated in FIG. 6 should be considered non-limiting. It is contemplated that in alternative exemplary embodiments, such a filter assembly could, for instance, include two banks each having a single wall segment of filter media supported between a front divider and a back divider and not include intermediate divider panels. Other exemplary embodiments could, for instance, include more than two wall segments supported on each side between two of more than three dividers, in which case the filter assembly would include as many divider panels as necessary to provide support the total number of filter media wall segments. In other words, the wall segments may be stacked using additional dividers to form banks that can be incorporated into housing canisters of varying dimensions. The number of stacked wall segments, as well as their dimensions and the dimensions of the filter assembly frame, can be varied and depend on the back pressure, filtration, size, manufacturing, and other requirements of a particular application. Therefore, as opposed to conventional wall-flow filter assemblies, the present exemplary filter assembly can be modified for incorporation into housing canisters of many varying dimensions and applications.

Referring now to FIGS. 7a and 7b, an exemplary embodiment of a cylindrical filter assembly that can be configured to be incorporated into an exhaust treatment device is illustrated in opposing views. Exemplary filter assembly 210 includes a cylindrical pleated filter element 212 that comprises a ceramic fiber-based media formed into a plurality of pleats. The plurality of pleats is bent into a cylindrical arrangement so as to form alternately opposing inwardly radiating pleated contours 216 (that forms an inner periphery) and outwardly radiating pleated contours 220 (that forms an outer periphery). The alternately opposing pleated contours thus form a plurality of radially extending elongated channels that run in an axial direction to the cylindrical structural frame of the filter assembly.

The structural frame of the exemplary filter assembly illustrated in FIGS. 7a and 7b can be formed from a ceramic injection molding or casting process and includes a cylindrical core 226 that may be axially positioned within the inner periphery of the cylindrical filter element to form a hollow axial region. The cylindrical core may be of conventional design and may be made of any material having sufficient strength and which is compatible with the exhaust emissions being filtered. The cylindrical core supports the inner periphery of the filter element against forces in the radial direction and also helps to give the filter element axial strength and rigidity against bending. A plurality of core openings 228 are formed through the cylindrical core to permit the passage of exhaust emissions into and through the hollow region.

As illustrated in the exemplary embodiment of FIGS. 7a and 7b, front and back annular end disks 230, 232 may be attached to the front and back axial ends 234, 236 of the filter assembly. The end disks may, for example, be attached to the filter element, and they may also be attached to the cylindrical core. In exemplary embodiments, conventional techniques, such as by use of an epoxy, thermal bonding, or spin welding, can be used to attach the end disks to the components of the filter assembly. The material, of which the end disks are formed, as well as the shape of the end disks, can be selected in accordance with the filtering conditions and the materials of the members.

The front end disk is closed to form a shield on the front axial end of the filter assembly that blocks the passage of exhaust flow between the hollow region within the cylindrical core and the front axial end. A center nose portion 238 adjacent to the cylindrical core, as well as a plurality of spacer knobs 240, project outwardly from the front end disk. The back end disk includes an annular opening 242 adjacent to the cylindrical core to create a passage for exhaust flow between the hollow region within the cylindrical core and the back axial end.

Figure 8:
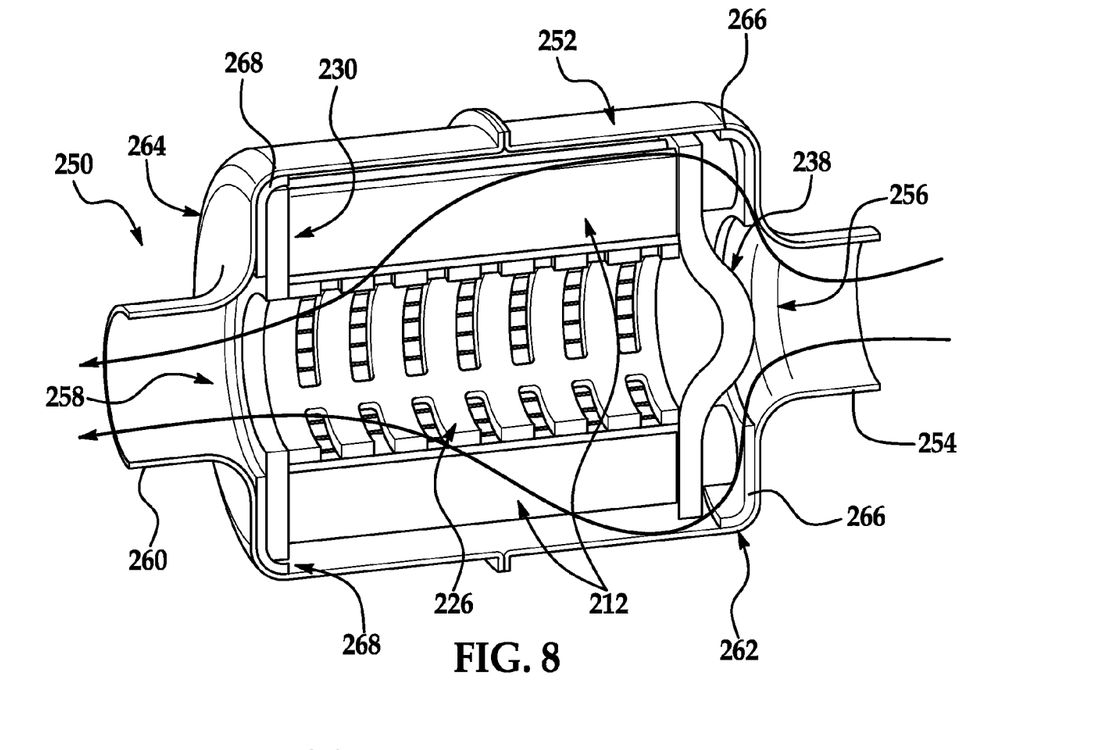
FIG. 8 is a cross-sectional view of an exemplary embodiment of an exhaust treatment device incorporating the exemplary filter assembly of FIGS. 7a and 7b.

Referring now to FIG. 8, an exemplary embodiment of an exhaust treatment device is illustrated that incorporates exemplary filter assembly 210 of FIGS. 7a and 7b. Exhaust treatment device 250 is configured to receive emissions from an exhaust-producing system (not shown) and to remove particulates and gaseous compounds from the emissions before being exhausted to the atmosphere. The exhaust treatment device includes a housing canister 252 within which the filter assembly is disposed.

The housing has a conical exhaust inlet 254 configured to receive an exhaust flow from the exhaust-producing system, an inlet chamber 256, an outlet chamber 258, and a conical exhaust outlet 260. The housing is depicted in FIG. 8 as having a rectangular cross-sectional shape along its length. Nevertheless, it should be noted that the cross-sectional shape of the housing in the present exemplary embodiment should be considered non-limiting, and it is also contemplated that, in other exemplary embodiments, the housing may have a cross-sectional shape other than rectangular such as, for example, circular, square, oval, or another appropriate shape.

Figure 11:
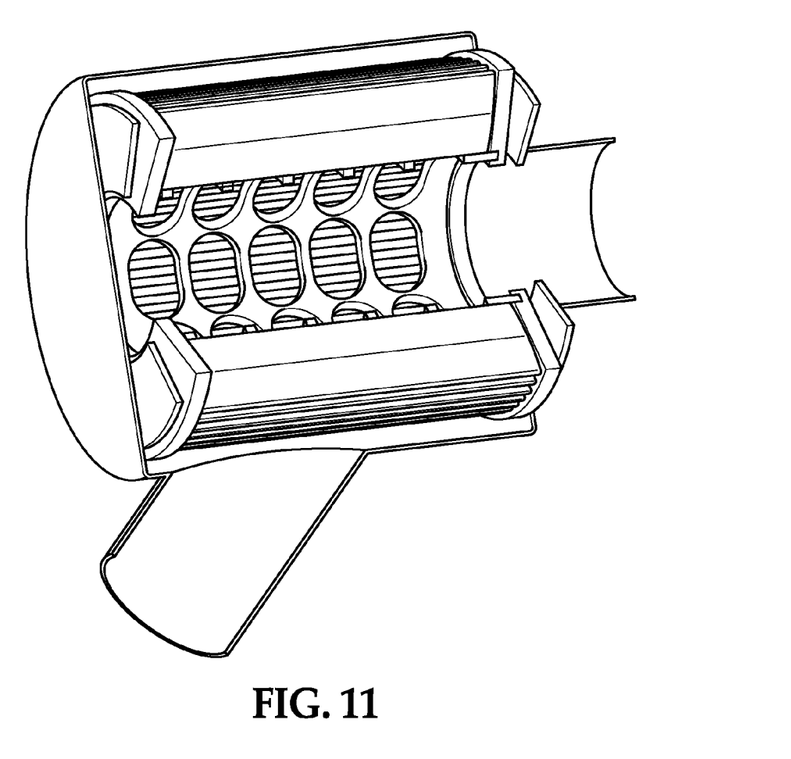
FIG. 11 is a cross-sectional view of an alternative exemplary embodiment of an exhaust treatment device incorporating the exemplary filter assembly of FIGS. 7a and 7b.

The inlet is depicted in FIG. 8 as having a substantially circular cross-section. Nevertheless, it should be noted that the cross-sectional shape of the inlet in the present exemplary embodiment should be considered non-limiting, and it is also contemplated that, in other exemplary embodiments, the inlet may have a differently shaped cross-section such as oval, square, rectangular, triangular, or any other suitable cross-section. The outlet is depicted in FIG. 8 as having a substantially circular cross-section. Nevertheless, it should be noted that the cross-sectional shape of the outlet in the present exemplary embodiment should be considered non-limiting, and it is also contemplated that, in other exemplary embodiments, the outlet may have a differently shaped cross-section such as oval, square, rectangular, triangular, or any other suitable cross-section. In FIG. 8, the inlet is shown as projecting from a first end 262 of the housing in a length direction of the housing, and the outlet is shown as projecting from a second end 264 of the housing in the length direction of the housing, opposite the first end. Nevertheless, it should be noted that the present exemplary embodiment should be considered non-limiting, and it is also contemplated that, in other exemplary embodiments, the inlet and/or the outlet may alternately project from a side of the housing that is orthogonal or tangential to the length direction. For instance, in the alternative exemplary embodiment of an exhaust treatment device that incorporates exemplary filter assembly 210 of FIGS. 7a and 7b illustrated in FIG. 11, the inlet is depicted as projecting generally orthogonally from a side of the housing.

In the present exemplary embodiment, the filter assembly is disposed within the housing to extend from the inlet to the outlet in an exhaust gas path, as indicated by the arrows in FIG. 8. The knobs of the front end disk are configured to engage a front heat-barrier matting layer 266 on the inside of the first end of the housing. The back end disk is configured to engage a back heat-barrier matting layer 268 on the inside of the second end of the housing. The end disks are engaged to the matting layer to maintain the filter assembly in a fixed position within the housing. The matting layer is further provided in order to prevent the heat from being radiated outward via the housing. In exemplary embodiments, the exhaust treatment device may include a means for sealing the filter assembly to one or more locations on the matting layers within the inside of the housing. These means for sealing may include, for example, a ceramic paste, a weld, a braze, a compression of the front end disk and/or the back end disk with the matting layers, a gasket, or any other known means. When the filter is fixed within the housing in this manner, the nose portion of the front end disk projects toward the housing inlet while the separation provided by the spacer knobs creates an open space for exhaust flow within the inlet chamber, and the annular opening of the back end creates a passage for exhaust flow between the cylindrical core of the filter assembly and the outlet.

The present exemplary exhaust treatment device operates in the following manner. When the diesel engine is driven, exhaust emissions bearing hazardous particulates are directed into the exhaust flow path via the exhaust pipe to flow into the housing inlet. The configuration of the exhaust treatment device facilitates the redirection of the flow of the exhaust emissions from the housing inlet into the inlet chamber and around the front end disk to the outer periphery of the pleated filter element, then through the filter element to the hollow region within the cylindrical core, and then toward the housing outlet. As the exhaust emissions flow through the filter assembly, the particulates contained in the emissions are collected within the pleated filter element. The resulting clean exhaust emissions that are directed from the hollow region are then discharged from the exhaust treatment device through the outlet.

Figure 9:
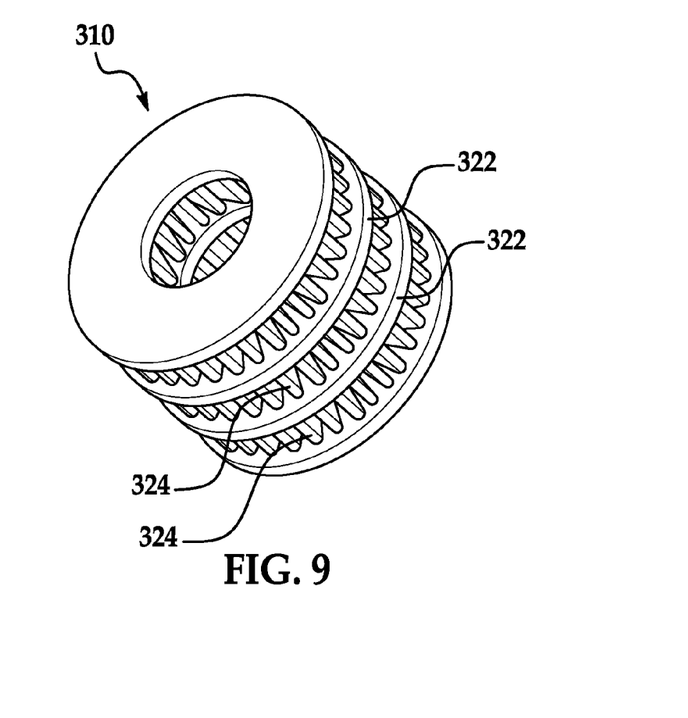
FIG. 9 is a side view of a third alternative exemplary embodiment of a filter assembly in accordance with the present invention.
Figure 10:
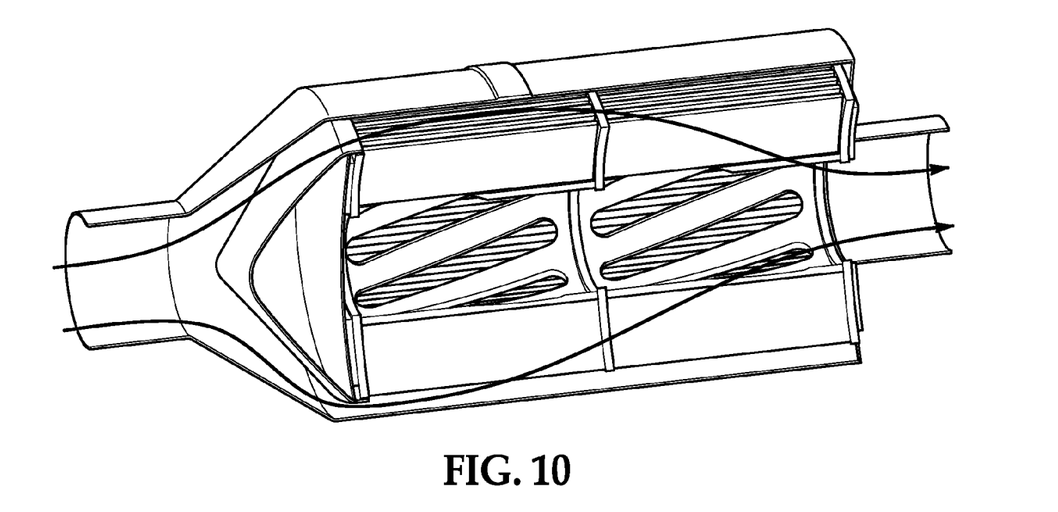
FIG. 10 is a cross-sectional view of an exemplary embodiment of an exhaust treatment device incorporating a fourth alternative exemplary embodiment of a filter assembly in accordance with the present invention.

It should be noted that the dimensions of the present exemplary filter assembly can vary, for example, according to the dimensions of the exhaust treatment device in which it is to be incorporated. For instance, the cylindrical pleated filter elements can be configured to be of a transverse width (that is, end disk-to-end disk distance) appropriate for the width of the pleated filter elements as manufactured and/or the dimensions of the housing in which the filter assembly will be incorporated. In alternative exemplary embodiments, as illustrated in FIG. 9, a filter assembly 310 can include one or more intermediate disks 322 to support multiple cylindrical pleated filter elements 324. Each intermediate disk includes an annular opening adjacent to the filter assembly's cylindrical core to create a passage for exhaust flow between the hollow region within the cylindrical core and the back axial end of the filter assembly. As with the columns of pleated filter media in the exemplary filter assembly of FIG. 1 and the wall segments of pleated filter media illustrated in the exemplary filter assembly of FIG. 6, both the number and the size of the cylindrical pleated filter elements should be considered non-limiting. The filter assembly can include as many intermediate disks as necessary to provide support the total number of cylindrical filter elements in particular exemplary embodiments. For instance, in the exemplary embodiment illustrated in FIG. 10, an exhaust treatment device is shown that includes a filter assembly incorporating two cylindrical filter elements stacked within a housing. The filter assembly incorporates an intermediate disk between the two filter elements and a pair of opposing end disks that are configured to maintain the filter assembly in a fixed position within the housing.

In addition, it is contemplated that in alternative exemplary embodiments, such a filter assembly could, for instance, include more than one cylindrical units of the type described stacked in the direction of the exhaust flow path within the housing so that the rear end disk of each unit abuts the spacer knobs of the front end disk of the immediately downstream unit (when present). In this configuration, the knobs of the foremost front end disk can engage a front heat-barrier matting layer on the inside of the first end of the housing, and the rearmost back end disk can engage a back heat-barrier matting layer on the inside of the second end of the housing. These end disks can be engaged to the matting layer to maintain the filter assembly in a fixed position within the housing. Therefore, alternate exemplary embodiments of the present filter assembly can be configured so that more than one filter assembly may be incorporated into a housing canister to suit the particular dimensions of that housing. The number of stacked assemblies, as well as their dimensions, may be variable and depend on the back pressure, filtration, size, manufacturing, and other requirements of a particular application.

In addition to the non-limiting exemplary embodiments described above, exemplary embodiments of filter assemblies in accordance with the present invention can be formed into many other geometries by varying the number and dimensions of the pleated filter media elements, such as by stacking or banking together elements together, to suit a particular application or the dimensions of a particular housing canister. Examples of other shapes that can be utilized for the pleated filter elements to meet a particular exhaust manufacturer's requirements can include flat, round, rectangular, panel, conical, and oval, as well as other appropriate shapes. Therefore, a filter assembly in accordance with the present invention is not limited by dimensional requirements for conventional wall-flow filters. This packaging flexibility allows for a filter assembly to be configured with a preferred geometry for lower-cost assembly and lower-cost installation into a particular housing canister, as well as to have a tight-fit in a fixed position within a particular housing canister for improved durability. For example, a filter assembly can be configured to have a geometry that is suitable for use in a housing canister in which closely packed pleats are required due to size limitations imposed by the environment in which the exhaust treatment device is to be employed.

Filter assembles employing depth filtration can enable exhaust treatment devices to remove diesel particulate matter at high filtration efficiency and a fraction of the backpressure of conventional wall-flow monolithic filters, thereby increasing the efficiency of the engine and decreasing fuel consumption. Exemplary embodiments of the present invention can be implemented to provide filter assemblies that can be employed to further increase filtration efficiency and reduce backpressure beyond that of conventional depth filter assemblies. Moreover, exemplary embodiments of filter assemblies in accordance with the present invention can be configured to weigh significantly less than conventional wall-flow filters, can provide lower thermal mass and higher soot-loading capacity, and can accommodate higher exhaust flow rates. The lower thermal mass, in particular, further reduces fuel consumption by achieving soot combustion temperatures more quickly, thereby requiring less auxiliary energy for filter cleaning.

Exemplary embodiments of filter assemblies in accordance with the present invention can employ filter elements having a simple pleated design. These pleated filter elements can be manufactured in high-volume using established processes, such as those utilizing an inorganic binder. U.S. Pat. No. 6,913,059 (the '059 patent), the contents of which are incorporated herein by reference thereto, is directed to methods of forming a ceramic fiber-based filter medium. Exemplary embodiments of the present invention can incorporate filter elements formed according to aspects of the methods disclosed in the '059 patent.

In exemplary embodiments, the pleated filter elements can have a media thickness of 0.05-0.080" and a pleat height of 1-3", and can be constituted of a ceramic fiber material such as, for example, one comprising silicon carbide. Ceramic fibers, such as those described in U.S. Pat. No. 5,087,272, those described in U.S. Pat. No. 4,873,069, aluminum oxide fibers from Saffil of Berwyn, Pa., alumino silicate fibers from Thermal Ceramics of Augusta, Ga., or combinations thereof, are also suitable for inclusion in exemplary embodiments of the present invention. Following formation of the ceramic fiber-based web, the fibers can be treated with a binder assist agent, dried, and at least partially bonded to neighboring fibers using the inorganic binder. In exemplary embodiments, a filter element can include from about 2 to about 7 layers of depth filter media. The use of multiple media layers can increase the soot capacity of a filter module by overcoming the plugging that occurs in the top 20-30% of a single layer media, thereby enabling greater soot penetration and reducing regeneration frequency.

Exemplary embodiments of filter assemblies in accordance with the present invention may be applicable to an exhaust treatment device used for any combustion-type system such as, for example, an engine, a furnace, or any other system known in the art where the removal of gaseous compounds and/or particulate matter from an exhaust flow is desirable. It is also contemplated that such filter assemblies may be used with a non-combustion type system such as, for example, a dust collection system.

As described above, exemplary embodiments of the present invention can be implemented to provide a pleated ceramic particulate filter for diesel exhaust systems that can reduce system backpressure, increase fuel efficiency, provide for weight reduction, increase durability of the diesel particulate filter, and offer greater packaging flexibility over current monolithic style filters.

Exemplary embodiments of the present invention can be implemented to utilize pleated ceramic filter media that itself offers a lower initial system restriction over current monolithic style filters due to the media style and filter geometry. Diesel particulate filters are non-serviceable components that must be frequently regenerated to burn away the soot particulate that has collected. Exemplary embodiments of the present invention can be implemented to provide a pleated ceramic diesel particulate filter that offers a lower thermal mass than the current monolithic style filters and thereby requires less fuel consumption to regenerate. As a result of the pleated style geometry of the filter media utilized, exemplary embodiments can be implemented to provide a the pleated diesel particulate filter has a much lower mass than the honeycomb style monolithic diesel particulate filter for a given volume. As a result of the lower relative mass and geometry differences described above, exemplary embodiments can be implemented to provide a pleated ceramic style filter that will not be subject to the same thermal gradients as a monolithic style filter during regeneration periods. Exemplary embodiments of the present invention can be implemented to allow for pleated ceramic style diesel particulate filters to be formed into many different geometries (e.g., round, panel conical, oval, etc.). Exemplary embodiments of the present invention can be implemented to allow for pleated ceramic diesel particulate filters that can be standardized and banked together in racks for greater media area.

In accordance with exemplary embodiments of the present invention, a ceramic filter media is pleated and then contained within a structural frame of ceramic or metal to form a filter assembly. The filter assembly can then be contained within an exhaust via a metal canister. Exemplary embodiments can be implemented according to the geometries involved to provide for a greater amount of surface area and, thus, less back pressure.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A filter assembly configured to be incorporated into an exhaust treatment device, the filter assembly comprising:
   a frame having a first end and a second end, the first and second ends defining a frame length therebetween;
   a plurality of filter media elements arranged within the frame in parallel along the frame length, each filter media element of the plurality of filter media elements being shaped as a series of pleated contours extending generally perpendicular to the frame length, the plurality of filter media elements including a first filter media element disposed proximate to the first end and a second filter media element disposed proximate to the second end; and
   a plurality of dividers supporting the plurality of filter media elements within the frame, the plurality of dividers including a first divider disposed adjacent to the first filter media element at the first end of the frame, a second divider disposed adjacent to the second filter media element at the second end of the frame, and at least one intermediate divider,
   wherein a distinct intermediate divider of the at least one intermediate dividers is disposed between each pair of adjacent filter media elements of the plurality of filter media elements along the frame length,
   wherein the frame includes a pair of generally rectangular opposing sidewalls extending generally parallel to one another from the first end to the second end along the frame length, the dividers of the plurality of dividers comprise generally rectangular panels extending generally perpendicular to the frame length, the pair of opposing sidewalls and the first and second dividers provide the frame with a generally rectangular cross-sectional shape, and the filter media elements of the plurality of filter media elements comprise columns of pleated filter media extending between the pair of opposing sidewalls,
   wherein the columns of pleated filter media are exposed on opposing sides of the rectangular cross-sectional shape of the frame to define an inlet flow side and an outlet flow side, and
   wherein the first divider includes a first transverse flange projecting outwardly from the first side of the frame at the outlet flow side and the second divider includes a second transverse flange projecting outwardly from the second side of the frame at the inlet flow side, the first and second flanges being configured to engage the wall of a housing of the exhaust treatment device in which the filter assembly is configured to be incorporated such that the filter assembly will align within the housing in a fixed, angled position.

2. The filter assembly of claim 1, wherein the frame is comprised of a material selected from the group consisting of ceramics, metals, and polymers.

3. The filter assembly of claim 2, wherein the material is silicon carbide and the frame is formed from a ceramic injection molding process.

4. The filter assembly of claim 1, wherein the filter media elements of the plurality of filter media elements are comprised of a ceramic fiber material.

5. The filter assembly of claim 4, wherein the ceramic fiber material is selected from the group consisting of silicon carbide, silicon nitride, cordierite, aluminum oxide, alumina silicate, and combinations thereof.

6. The filter assembly of claim 1, wherein the filter media elements of the plurality of filter media elements has a media thickness in the range from about 0.05 to about 0.08 inches and the series of pleats of each filter media element has a pleat height in the range from about 1 to about 3 inches.

7. The filter assembly of claim 1, wherein each filter media element of the plurality of filter media elements includes a plurality of filter media layers.

8. A filter assembly configured to be incorporated into an exhaust treatment device, the filter assembly comprising:

a frame having a first end and a second end, the first and second ends defining a frame length therebetween;

a plurality of filter media elements arranged within the frame in parallel along the frame length, each filter media element of the plurality of filter media elements being shaped as a series of pleated contours extending generally perpendicular to the frame length, the plurality of filter media elements including a first filter media element disposed proximate to the first end and a second filter media element disposed proximate to the second end; and a plurality of dividers supporting the plurality of filter media elements within the frame, the plurality of dividers including a first divider disposed adjacent to the first filter media element at the first end of the frame, a second divider disposed adjacent to the second filter media element at the second end of the frame, and at least one intermediate divider, wherein a distinct intermediate divider of the at least one intermediate dividers is disposed between each pair of adjacent filter media elements of the plurality of filter media elements along the frame length, wherein the frame has a generally cylindrical shape and includes a hollow cylindrical core axially extending from the first divider to the second divider along the frame length, the cylindrical core having a plurality of core openings permitting exhaust flow therethrough, the dividers of the plurality of dividers being configured as generally circular disks and being disposed generally perpendicular to the frame length, the second divider and the at least one intermediate divider including an annular opening adjacent to the cylindrical core permitting exhaust flow therethrough, the first divider being closed to substantially prevent exhaust flow therethrough, the filter media elements of the plurality of filter media elements being configured as cylinders of pleated filter media extending circumferentially about the cylindrical core, and wherein the first divider includes a center nose portion adjacent to the cylindrical core and a plurality of spacer knobs, the center nose portion and the plurality of spacer knobs projecting outwardly from the first end.

9. The filter assembly of claim 8, wherein the frame is comprised of a ceramic material, wherein the ceramic material is selected from the group consisting of silicon carbide, silicon nitride, cordierite, aluminum oxide, alumina silicate, and combinations thereof and the frame is formed from a ceramic injection molding process and wherein the filter media elements of the plurality of filter media elements are comprised of a ceramic fiber material, wherein the ceramic fiber material is selected from the group consisting of silicon carbide, silicon nitride, cordierite, aluminum oxide, alumina silicate, and combinations thereof.

10. An exhaust treatment device comprising:
a housing having an inlet end and an outlet end;
an inlet flow member configured to direct exhaust emissions into the housing and extending outwardly from the inlet end of the housing;
an outlet flow member configured to discharge exhaust emissions from the housing and extending outwardly from the outlet end of the housing;
a first heat-barrier matting layer disposed within the housing proximate to the inlet end;
a second heat-barrier matting layer disposed within the housing proximate to the outlet end; and
a filter assembly configured to be incorporated into the housing, the filter assembly having a frame, a plurality of filter media elements, and a plurality of dividers, the frame having a first end adjacent to the inlet end of the housing and a second end adjacent to the outlet end of the housing, the first and second ends defining a frame length therebetween, the plurality of filter media elements being arranged within the frame in parallel along the frame length, each filter media element of the plurality of filter media elements being shaped as a series of pleated contours extending generally perpendicular to the frame length, the plurality of filter media elements including a first filter media element disposed proximate to the first end and a second filter media element disposed proximate to the second end, the plurality of dividers supporting the plurality of filter media elements within the frame, the plurality of dividers including a first divider disposed adjacent to the first filter media element at the first end of the frame, a second divider disposed adjacent to the second filter media element at the second end of the frame, and at least one intermediate divider such that a distinct intermediate divider of the at least one intermediate divider is disposed between each pair of adjacent filter media elements of the plurality of filter media elements along the frame length,
wherein the filter assembly is configured so that the first and second dividers engage the first and second heat-barrier matting layers respectively to align the filter assembly in a fixed position within the housing so that exhaust emissions flowing from the inlet member to the outlet member pass through the plurality of filter media elements.

11. The exhaust treatment device of claim 10, wherein the housing has a cross-sectional shape along its length selected from the group consisting of round, rectangular, flat panel, conical, cylindrical, and oval.

* * * * *